United States Patent Office 3,625,008
Patented Dec. 7, 1971

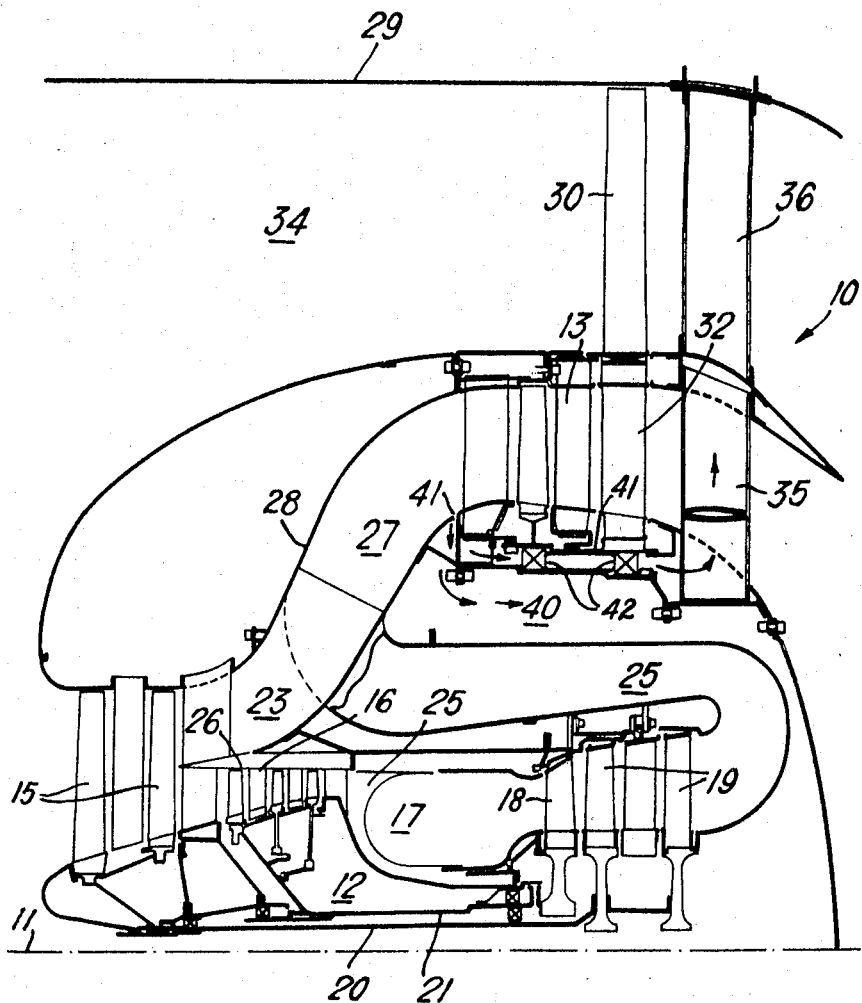

3,625,008
GAS TURBINE POWER PLANT
Colin Taylor Hewson, Duffield, and John A. H. Scott, Derby, England, assignors to Rolls-Royce Limited, Derby, England
Filed Sept. 24, 1969, Ser. No. 860,728
Claims priority, application Great Britain, Sept. 27, 1968, 46,076/68
Int. Cl. F02k 3/04
U.S. Cl. 60—226
6 Claims

ABSTRACT OF THE DISCLOSURE

A gas turbine power plant including a gas turbine engine having compressor means, combustion equipment and turbine means in flow series, a by-pass duct communicating with the compressor means and curving radially outwardly therefrom for receiving a portion of the compressed air, a main exhaust gas flow duct communicating with the turbine means and curving radially outwardly and then forwardly, the main exhaust gas flow duct and the by-pass duct communicating with each other and a further duct adjacent the forward region of the engine, the further duct extending rearwardly for discharging the mixture of air and gas. Free turbine means are positioned in the further flow duct and carry a fan and since the free turbine means is subjected to a relatively cool fluid, it may be made of light weight metal. The free turbine means, by reason of the particular arrangement of ducts, is located within the axial extent of the gas turbine engine whereby the power plant is particularly adaptable for VTOL aircraft.

---

This invention relates to gas turbine power plant.

According to the present invention, there is provided a gas turbine power plant comprising a gas turbine by-pass engine having a main flow duct and a by-pass duct each of which ducts communicates with an exhaust duct in which is mounted a free turbine means, said free turbine means carrying a fan for rotation therewith, said fan being located entirely within the axial extent of said engine in a fan duct surrounding said exhaust duct.

In operation, the by-pass air and the main exhaust may be mixed in said exhaust duct and the mixture is then passed through said free turbine means.

Preferably, said exhaust duct is apertured so that in operation gases may pass out therefrom to a space radially inwardly of said fan for cooling purposes.

The turbine means of the said engine and the free turbine means may be substantially in the same radial plane.

The invention will be described, merely by way of example, with reference to the accompanying drawing, which is an axial section through a preferred embodiment of a gas turbine power plant in accordance with the present invention.

Referring to the drawing, there is shown a gas turbine power plant 10 having a longitudinal axis 11 about which rotate in opeation the rotary parts of a gas generator 12. The gas generator 12 is in the form of a gas turbine by-pass engine adapted to supply gases to drive a two-stage axial-flow free turbine 13. The gas generator 12 comprises in axial flow series, a two-stage low pressure compressor 15, a three-stage high pressure compressor 16, combustion equipment 17, a single-stage high pressure turbine 18, and a two-stage low pressure turbine 19. The low pressure compressor 15 is adapted to be driven by the low pressure turbine 19 by way of a shaft 20. The high pressure compressor 16 is adapted to be driven by the high pressure single stage turbine 18 by way of a shaft 21 which is coaxial with and surrounds the shaft 20. Appropriate stator stages are provided between successive rotor stages, except that the low pressure compressor 15 has no intake guide vanes, and there is no stator stage between the high pressure turbine 18 and the first stage of the low pressure turbine 19.

A portion of air compressed in operation by the low pressure compressor 15 is passed to a by-pass duct 23, whereas the remainder is passed to the main flow duct 25, the two ducts being separated by a casing member 26 located around the high pressure compressor 16.

As can be seen, the by-pass duct 23 is curved radially outwardly, while the main flow duct 25 is provided downstream of the low pressure turbine 19 with a substantially 180° turn, and is then substantially axial again. In the region radially outwardly of the high pressure compressor 16, the duct 25 is arranged to intersect with the by-pass duct 23, whereby in operation, the by-pass air compressed by the low pressure compressor 15 and the exhaust gases are mixed and conducted to the free turbine means 13. The duct in which the free turbine means 13 is located may be termed a first flow duct 27. The radially outer wall of a duct 27 is defined by a casing member 28 which also defines the radially outer wall of the low pressure compressor 15.

The second or downstream stage 32 of the free turbine means 13 carries an integral fan 30. The fan 30 is located in a fan duct 34 defined between the radially outer portion of the casing member 28 and an outer casing 29. The second stage 32 of the free turbine means 13 is followed by a stator stage 35, while the fan 30 is followed by a stator stage 36, the stator stages 35, 36 being non-integral.

It will be appreciated that the gases flowing in a first flow duct 27 comprise a mixture of by-pass air and main exhaust from the gas generator 12 for driving the free turbine means 13. Consequently, the temperature of this mixture is considerably cooler than if the free turbine means 13 were driven solely by the exhaust gases. As a result of this cooling, the free turbine means 13 may be made of lighter material, since high-temperature resistant metals or alloys tend to be heavier. The said lighter material may be a fibre-reinforced plastics material.

An annular space 40 is defined between the radially outer wall of the main duct 25 and the radially inner end of the duct 27 and it accommodates the rotor shaft 41 for the two-stage free turbine means 13 with appropriate bearings 42.

Provision is made for cooling the structure in the space 40 by providing an aperture in the inner wall of the duct 27, e.g. at 41, whereby a cooling mixture of exhaust gases and by-pass air may pass through that space to cool the bearings 42 and other parts, and if desired, cooling may also be provided for the stators 35 and possibly 36 as well by making them hollow and causing said cooling mixture to pass therethrough, as indicated by arrows.

The power plant 10 of the preferred embodiment has a large frontal area but very short axial length, and the fan 30 is located entirely within the axial extent of the gas generator 12. As a result it is particularly suitable for use as a vertical lift jet engine adapted to be mounted with its axis 11 substantially vertical on an aircraft.

We claim:

1. A gas turbine power plant comprising:
    a gas turbine engine including a low pressure compressor, a high pressure compressor, combustion equipment, and turbine means in flow series and defining an axial extent of the engine;
    a by-pass duct having an inlet end communicating with said low pressure compressor for receiving a portion of air compressed thereby and an outlet end, said duct, from its inlet end, curving radially outwardly of said engine;

a main exhaust gas flow duct having an inlet end communicating with said turbine means and an outlet end, said main exhaust gas flow duct, from its inlet end, immediately curving radially outwardly and then extending forwardly along said engine;

a further flow duct for a mixture of air and exhaust gas and having an inlet end operatively connected to the outlet end of said by-pass duct and to the outlet end of said exhaust gas flow duct, said further flow duct extending in a downstream direction and outwardly of said exhaust gas flow duct;

a free turbine means mounted in said further flow duct and driven by the mixture of air and exhaust gases;

a fan carried by said free turbine means, said fan and said free turbine means being located entirely within the axial extent of said engine;

and a fan duct surrounding said further flow duct and in which said fan is located.

2. A power plant as claimed in claim 1 wherein said further flow duct is apertured upstream of said free turbine means so that in operation a portion of the mixture of air and exhaust gas passes therefrom radially inwardly between said further flow duct and said exhaust flow duct for cooling purposes.

3. A power plant as claimed in claim 1 including a hollow rotor shaft for said free turbine means positioned between said further flow duct and said exhaust gas flow duct and surrounding said engine.

4. A power plant as claimed in claim 1 in which said inlet end of said further flow duct is operatively connected to the outlet end of said by-pass duct and to the outlet end of said exhaust gas flow duct in a region radially outwardly of the high pressure compressor.

5. A power plant as claimed in claim 1 including a hollow rotor shaft for said free turbine means, said rotor shaft surrounding said engine and located between said exhaust flow duct and said further flow duct, aperture means in said further flow duct forward of said free turbine means for passing air inwardly between said further flow duct and said main exhaust gas flow duct for cooling purposes.

6. A power plant as claimed in claim 1 wherein the turbine means of the said engine and the free turbine means are substantially in the same radial plane.

References Cited

UNITED STATES PATENTS

| 3,253,406 | 5/1966 | Grieb | 60—39.16 |
| 3,348,379 | 10/1967 | Wilde | 60—226 |
| 3,462,953 | 8/1969 | Wilde | 60—39.16 |

FOREIGN PATENTS

| 1,002,462 | 8/1965 | Great Britain | 60—226 |
| 1,004,641 | 9/1965 | Great Britain | 60—226 |

DOUGLAS HART, Primary Examiner

U.S. Cl. X.R.

60—39.16, 262